United States Patent
Tanaka et al.

(10) Patent No.: US 10,222,906 B2
(45) Date of Patent: Mar. 5, 2019

(54) INPUT DEVICE FOR VEHICLE AND METHOD OF CONTROLLING INPUT DEVICE FOR VEHICLE

(71) Applicant: TOYOTA JIDOSHA KABUSHIKI KAISHA, Toyota-shi, Aichi-ken (JP)

(72) Inventors: Seiichi Tanaka, Toyota (JP); Yusuke Takeuchi, Miyoshi (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/855,511

(22) Filed: Dec. 27, 2017

(65) Prior Publication Data
US 2018/0210605 A1 Jul. 26, 2018

(30) Foreign Application Priority Data
Jan. 23, 2017 (JP) .................... 2017-009864

(51) Int. Cl.
*G06F 3/041* (2006.01)
*G06F 3/0488* (2013.01)
(Continued)

(52) U.S. Cl.
CPC ........ *G06F 3/0416* (2013.01); *G06F 3/03547* (2013.01); *G06F 3/04847* (2013.01);
(Continued)

(58) Field of Classification Search
CPC ......... G09G 2300/026; G09G 2300/02; G09G 2360/04; G09G 2360/06; G06F 3/044;
(Continued)

(56) References Cited

U.S. PATENT DOCUMENTS

2012/0030619 A1* 2/2012 Lee .................... G06F 3/0482
715/810
2013/0106693 A1* 5/2013 Okuyama ........... G06F 3/0482
345/157
(Continued)

FOREIGN PATENT DOCUMENTS

| JP | 2013-097519 A | 5/2013 |
| JP | 2013-117870 A | 6/2013 |
| WO | 2015146567 A1 | 10/2015 |

*Primary Examiner* — Md Saiful A Siddiqui
(74) *Attorney, Agent, or Firm* — Hunton Andrews Kurth LLP (57) ABSTRACT

An input device for a vehicle includes a determiner to calculate a correspondence position corresponding to the position of an input operation in a display unit, and to determine a content of the input operation; and a controller to control displaying an object depending on a determination result of the determiner, and to overlappingly display a selection image to select an object at the correspondence position. When the selection image is overlappingly displayed with an object whose selection items are consecutively replaced and displayed by the input operation, if the position is moved without a preceding press or long press operation, the selection item to be displayed is changed by a predetermined count in the moved direction of the position; or if the position is moved after a preceding press or long press operation, the selection item is consecutively changed proportionally to the moved amount of the position.

6 Claims, 4 Drawing Sheets

(51) Int. Cl.
*G06F 3/0484* (2013.01)
*G06F 3/0354* (2013.01)

(52) U.S. Cl.
CPC .. *G06F 3/04883* (2013.01); *B60K 2350/1004* (2013.01); *G06F 2203/04101* (2013.01)

(58) Field of Classification Search
CPC ............. G06F 3/041; G06F 2203/0383; G06F 2203/0384
See application file for complete search history.

(56) References Cited

U.S. PATENT DOCUMENTS

2013/0215021 A1    8/2013   Morikawa et al.
2014/0016040 A1*   1/2014   Motoyama ............. G08C 17/00
                                                           348/734

* cited by examiner

INPUT DEVICE FOR VEHICLE AND METHOD OF CONTROLLING INPUT DEVICE FOR VEHICLE

CROSS-REFERENCE TO RELATED APPLICATIONS

This application is based upon and claims the benefit of priority of Japanese Priority Application No. 2017-009864 filed on Jan. 23, 2017, the entire contents of which are hereby incorporated by reference.

FIELD

The present disclosure relates to an input device for a vehicle and a method of controlling the input device for the vehicle.

BACKGROUND

Conventionally, there has been an input device that is provided with a touchpad on which the user performs an operation by a finger, to input a setting value for operating a predetermined device, where an input operation can be performed by a contact of the finger at a single spot or at multiple spots on the surface of the touchpad, and includes an adjuster unit to adjust the setting value or a change width for changing the setting value by a single finger operation, depending on increase or decrease in the contacting area on the surface while the finger operation is being performed (see, for example, Patent Document 1).

RELATED-ART DOCUMENTS

Patent Documents

[Patent Document 1] Japanese Unexamined Patent Application Publication No. 2013-117870

Meanwhile, with such a conventional input device, it is not easy to perform an input operation that requires multiple fingers to contact multiple spots, and hence, instead of performing an input operation that requires multiple fingers to contact multiple spots, the user may perform multiple input operations by a single finger. This is due to poor usability of such a conventional input device.

For example, when the user inputs the preset temperature of an air-conditioner, the user may want to raise or lower the temperature by one step (for example, 0.5° C.), or may want to raise or lower the temperature by multiple steps consecutively. This is the same for the case of inputting a selection item of the setting value of an in-vehicle device other than the air-conditioner, and the case of inputting a selection item such as an address on a navigation system.

Thereupon, it is an object of an embodiment to provide an input device for a vehicle and a method of controlling the input device for the vehicle that enable the user to easily operate an object whose selection items are replaced and displayed consecutively.

SUMMARY

According to an embodiment in the present disclosure, an input device for a vehicle includes a position detector placed in an interior of the vehicle, and configured to have an input operation surface on which a user performs an input operation, to detect a position at which the input operation is performed on the input operation surface; a display unit placed in the interior of the vehicle, and configured to display a plurality of objects; an operational content determiner configured, based on a moved amount of the position of the input operation, to calculate a correspondence position corresponding to the position of the input operation in the display unit detected by the position detector, and to determine whether a content of the input operation corresponds to a predetermined operational content; and a display controller configured to control displaying the object depending on a determination result of the operational content determiner, and to overlappingly display a selection image to select one of the objects located at the correspondence position, with the one of the objects. In a case where the selection image is overlappingly displayed with an object among the objects whose selection items are consecutively replaced and displayed by the input operation, (i) in response to the position of the input operation being moved along a predetermined direction, without a press operation or a long press operation having been performed as the input operation, the operational content determiner changes the selection item by a predetermined count irrespective of the moved amount of the position of the input operation along the predetermined direction, to cause the display controller to display the selection item, or (ii) in response to the position of the input operation being moved along the predetermined direction after a press operation or a long press operation has been performed as the input operation, the operational content determiner consecutively changes the selection item proportionally to the moved amount of the position of the input operation along the predetermined direction, to cause the display controller to display the selection item.

In this way, depending on whether a press operation or a long press operation has been performed, the operational content determiner changes the operational content by an operation that moves the input operation position. If an operation is performed that moves the input operation position without a press operation or a long press operation having been performed, the operational content determiner changes the selection item in the movement direction of the position of the input operation. Therefore, whether to consecutively change the item can be switched based on the operational amount in a specific direction by a press operation or a long press operation, and thereby, it is possible to provide an easy-to-follow interface on which the user can perform an operation as intended.

Therefore, it is possible to provide an input device for a vehicle that enables the user to easily operate an object whose selection items are replaced and displayed consecutively.

Also, in an input device for a vehicle according to another embodiment in the present disclosure, in a case where a press operation or a long press operation is performed again after a press operation or a long press operation has been performed, the operational content determiner cancels a mode to consecutively change the selection item proportionally to the operational amount in the movement direction of the position of the input operation.

In this way, if a press operation or a long press operation is performed again, it is possible to cancel the mode to consecutively change the selection item.

Therefore, it is possible to provide an input device for a vehicle that enables the user to easily operate an object whose selection items are replaced and displayed consecutively, and to easily cancel the mode to consecutively change the selection item.

Also, in an input device for a vehicle according to another embodiment in the present disclosure, in a case where a component of the operational amount of the input operation in a direction perpendicular to a direction in which the selection item is to be changed becomes greater than or equal to a predetermined threshold, the operational content determiner cancels a mode to consecutively change the selection item depending on the movement direction of the position of the input operation.

In this way, if a component of the operational amount of the input operation in a direction perpendicular to a direction in which the selection item is to be changed becomes greater than or equal to a predetermined threshold, it is possible to cancel the mode to consecutively change the selection item.

Therefore, it is possible to provide an input device for a vehicle that enables the user to easily operate an object whose selection items are replaced and displayed consecutively, and to easily cancel the mode to consecutively change the selection item. It is possible to cancel the mode, without changing the selection item, because the mode can be canceled based on an operation that is perpendicular in direction to the direction of operation for changing the selection item.

Also, in an input device for a vehicle according to another embodiment in the present disclosure, the selection image is a cursor representing a selection of one of the objects.

Using a cursor as a selection image to select an object in this way, selection of an object can be easily understandable.

Therefore, it is possible to provide an input device for a vehicle with which a cursor can be recognized immediately while maintaining easy recognizability of the entire display.

According to an embodiment in the present disclosure, a method of controlling an input device for a vehicle is provided. The input device for the vehicle includes a position detector placed in an interior of the vehicle, and configured to have an input operation surface on which a user performs an input operation, to detect a position at which the input operation is performed on the input operation surface; a display unit placed in the interior of the vehicle, and configured to display a plurality of objects; an operational content determiner configured, based on a moved amount of the position of the input operation, to calculate a correspondence position corresponding to the position of the input operation in the display unit detected by the position detector, and to determine whether a content of the input operation corresponds to a predetermined operational content; and a display controller configured to control displaying the object depending on a determination result of the operational content determiner, and to overlappingly display a selection image to select one of the objects located at the correspondence position, with the one of the objects. The method includes, in a case where the selection image is overlappingly displayed with an object among the objects whose selection items are consecutively replaced and displayed by the input operation, (i) in response to the position of the input operation being moved along a predetermined direction, without a press operation or a long press operation having been performed as the input operation, changing the selection item by a predetermined count irrespective of the moved amount of the position of the input operation along the predetermined direction, to cause the display controller to display the selection item, or (ii) in response to the position of the input operation being moved along the predetermined direction after a press operation or a long press operation has been performed as the input operation, consecutively changing the selection item proportionally to the moved amount of the position of the input operation along the predetermined direction, to cause the display controller to display the selection item.

In this way, depending on whether a press operation or a long press operation has been performed, the operational content determiner changes the operational content by an operation that moves the input operation position. If an operation is performed that moves the input operation position without a press operation or a long press operation having been performed, the operational content determiner changes the selection item in the movement direction of the position of the input operation. Therefore, whether to consecutively change the item can be switched based on the operational amount in a specific direction by a press operation or a long press operation, and thereby, it is possible to provide an easy-to-follow interface on which the user can perform an operation as intended.

Therefore, it is possible to provide a method of controlling an input device for a vehicle that enables the user to easily operate an object whose selection items are replaced and displayed consecutively.

It is possible to provide an input device for a vehicle and a method of controlling the input device for the vehicle that enable the user to easily operate an object whose selection items are replaced and displayed consecutively.

DESCRIPTION OF EMBODIMENTS

In the following, embodiments will be described in which an input device for a vehicle and a method of controlling the input device for the vehicle are applied.

Embodiments

Figure 1:
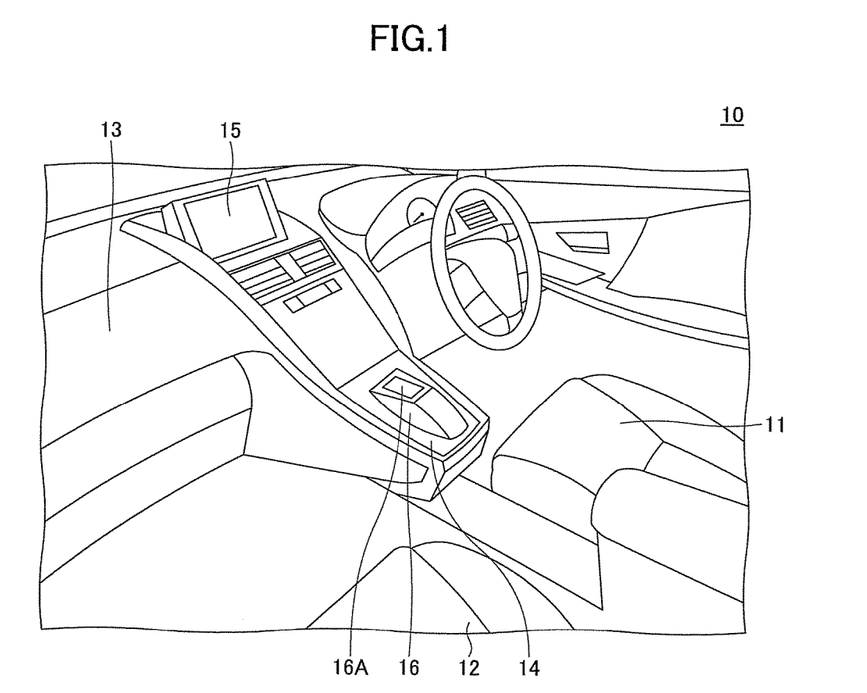
FIG. 1 is a diagram illustrating the inside of a vehicle 10 to which an input device for a vehicle according to an embodiment is applied.

FIG. 1 is a diagram illustrating the inside of a vehicle 10 to which an input device for a vehicle according to an embodiment is applied. In the interior of the vehicle 10, a dashboard 13 is placed in front of the driver's seat 11 and the passenger seat 12, and a center console 14 is placed between the driver's seat 11 and the passenger seat 12, extending from the center of the dashboard 13.

In the center of the dashboard 13, a display panel 15 is placed, and an input unit 16 is placed at the other end of the center console 14 (on the side away from the dashboard 13). The input unit 16 includes a touchpad 16A.

The display panel 15 is, for example, a liquid crystal panel, or may be a display panel of a type other than the liquid crystal panel. The display panel 15 can display various screens including, for example, a screen for a navigation system; a screen for setting a traveling mode and the like of the vehicle; a screen for setting an air-conditioner; an operation screen for an audio device; and an operation screen for a telephone. Depending on a selected mode (a mode for setting the navigation system or setting the traveling mode, a mode to execute a function of the air-conditioner, the audio device, or the telephone, etc.), various screens (images) are displayed on the display panel 15.

The touchpad 16A is of, for example, an electrostatic capacitance type or a resistance film type, to detect the position (coordinates) of a fingertip or a hand of the user contacting the surface of the touchpad 16A. The touchpad 16A is used when the user selects a cursor displayed on various screens displayed on the display panel 15. Hereafter, an input operation performed by the user with a fingertip or a hand touching the surface of the touchpad 16A may be referred to as an "input operation".

The input device for the vehicle according to the embodiment includes the display panel 15 and the input unit 16. The movement direction and the moved amount of an input operation performed on the touchpad 16A are associated with the movement direction and the moved amount of a cursor on the display panel 15.

In response to an input operation performed by the user with a fingertip or a hand on the surface of the touchpad 16A, a cursor displayed on the display panel 15 moves. A cursor is used for selecting an object from among various operational parts and the like of a GUI (Graphic User Interface). Operational parts of a GUI may include, for example, a button, a slider, and a dial.

Here, the display surface of the display panel 15 is rectangular, and similarly, the operation surface of the touchpad 16A is also rectangular. The movement direction of a cursor is the same as the movement direction of an input operation performed by the user on the touchpad 16A. If the input operation position is moved leftward, the cursor displayed on the display panel 15 also moves leftward, or if the input operation position is moved rightward, upward (toward the front of the vehicle), or downward (toward the rear of the vehicle), the cursor displayed on the display panel 15 also moves rightward, upward, or downward.

In this way, the user can move the cursor displayed on the display panel 15 by an input operation performed on the touchpad 16A. Furthermore, moving the cursor enables the user to select an object from among various operational parts of the GUI displayed on the display panel 15. Also, for example, the user may press the touchpad 16A to complete inputting on the object selected from among various operational parts of the GUI. Inputting by pressing is detected by, for example, a change of the contacting area of a fingertip or a hand on the touchpad 16A.

Figure 2:
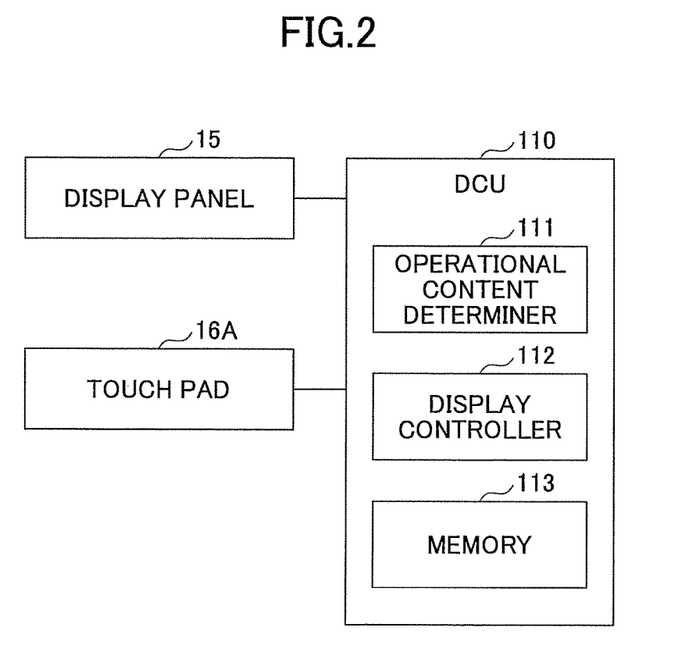
FIG. 2 is a diagram illustrating a configuration of an input device for a vehicle 100 according to an embodiment.

FIG. 2 is a diagram illustrating a configuration of the input device for the vehicle 100 according to the embodiment. The input device for the vehicle 100 includes a DCU (Display Control Unit) 110, the display panel 15, and the touchpad 16A. The display panel 15 is an example of a display unit, and the touchpad 16A is an example of a position detector. Also, the surface of the touchpad 16A is an example of an input operation surface. Note that in the following, suppose that an object displayed on the display panel 15 is a GUI button.

The DCU 110 is a type of an ECU (Electronic Control Unit), and is a control device to control an image to be displayed on the display panel 15. The DCU 110 includes an operational content determiner 111, a display controller 112, and a memory 113.

Similar to various ECUs installed in the vehicle 10, the DCU 110 is implemented by, for example, a computer that includes a CPU (Central Processing Unit), a RAM (Random Access Memory), non-volatile memories such as a ROM (Read-Only Memory) and a hard disk, a clock generator, an I/O interface, a communication interface, a transceiver, and an internal bus.

The DCU 110 includes a functional unit that displays various images including operational parts for setting the traveling mode of the vehicle, operational parts of the air-conditioner, operational parts of the audio device, and operational parts of the telephone, and receives an input operation performed by the user. The DCU 110 transmits a command represented in a received input operation to various ECUs including an ECU for setting the traveling mode of the vehicle and an ECU for the air-conditioner.

The operational content determiner 111 calculates a position on the display panel 15 corresponding to an input operation position detected by the touchpad 16A, based on the moved amount of the input operation position detected by the touchpad 16A.

Also, depending on whether a press operation or a long press operation has been performed, the operational content determiner 111 changes the operational content corresponding to a trace operation. Here, a "trace operation" is an operation to move a fingertip while contacting the touchpad 16A, to move the input operation position. Trace operations include, for example, a swipe operation, a drag operation, and a flick operation.

If a trace operation is performed without a press operation or a long press operation having been performed, the operational content determiner 111 changes the selection item by one in the operating direction of the trace operation. Alternatively, if a trace operation is performed after a press operation or a long press operation has been performed, the operational content determiner 111 consecutively changes the selection item proportionally to the operational amount in the operating direction of the trace operation.

Note that if a trace operation is performed after a press operation or a long press operation has been performed, and then, a press operation or a long press operation is performed again, the operational content determiner 111 cancels the mode to consecutively change the selection item. A process executed by the operational content determiner 111 will be described later using FIG. 4.

The display controller 112 controls displaying various images of GUI operational parts such as the GUI buttons and the GUI on the display panel 15 (display control). Also, the display controller 112 displays a cursor on the display panel 15 so as to overlap with a GUI button determined by the operational content determiner 111 as an existing correspondence position. To enable the user to indicate or select an object such as a GUI operational part or the like displayed on the display panel 15, the cursor is overlappingly displayed on the GUI operational part or the like. The cursor is an example of a selection image and the display controller 112 is an example of a display controller.

When the power of the input device for the vehicle 100 is turned on, depending on a mode to be selected, the display controller 112 displays GUI buttons, various images of the GUI, and the like on the display panel 15; displays a cursor on a predetermined default position, or on a predetermined default GUI operational part overlappingly; or displays a cursor on the display panel 15 so as to overlap with a GUI button for which the correspondence position has been calculated, and determined as existing within the button by the operational content determiner 111.

After an input operation has been performed on the touchpad 16A and a cursor has been moved within the display panel 15, if no input operation is performed, the display controller 112 holds, as it is, the state of the cursor overlappingly displayed on a GUI operational part at the position where the last input operation has terminated.

The memory 113 stores image data representing objects such as various types of GUI operational parts to be displayed on the display panel 15 (including operational parts of the telephone of the vehicle, operational parts of the air-conditioner, operational parts of the audio device, and operational parts for setting a GUI operational part representing the traveling mode of the vehicle). The memory 113 is a memory, for example, a RAM or a hard disk.

Figure 3A:
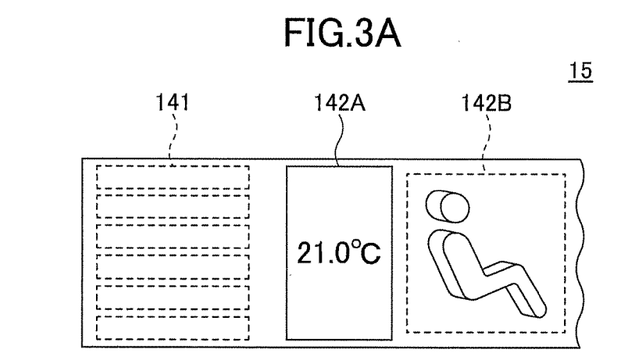
FIGS. 3A-3C are diagrams illustrating an input operation in the case of changing a temperature setting on an operation screen for an air-conditioner.
Figure 3B:
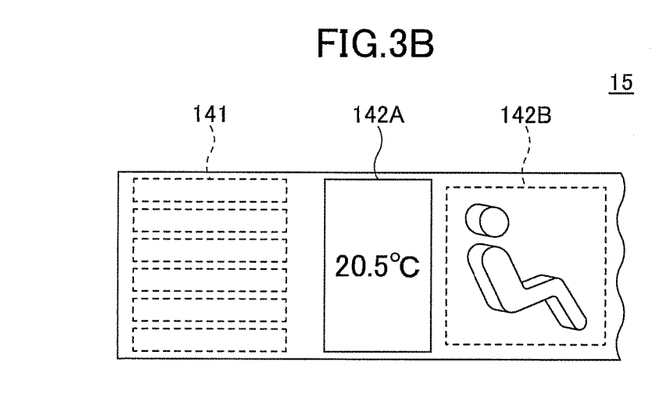
Figure 3C:
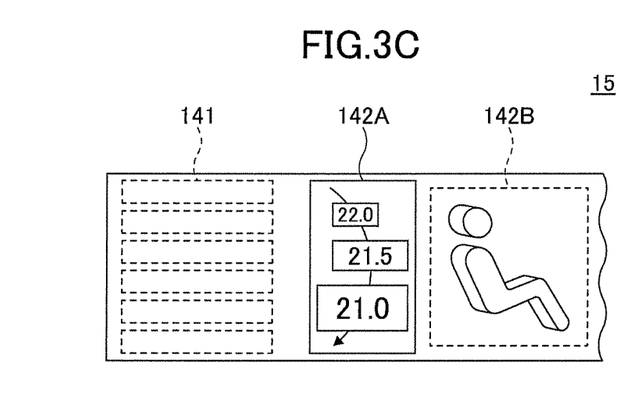

FIGS. 3A-3C are diagrams illustrating an input operation in the case of changing a temperature setting on an operation screen of an air-conditioner. Each of FIGS. 3A-3C illustrates, among objects on the display panel 15, six GUI buttons 141 vertically arranged on the left side, a GUI operational part 142A for setting the temperature around the front left seat, and a GUI operational part 142B for setting the wind direction and the amount of wind fanning the front left seat. Among the GUI operational parts 142A and 142B, the GUI operational part 142A is a GUI operational part of a dial type.

Suppose that in FIGS. 3A-3C, the cursor is overlappingly displayed on the GUI operational part 142A, as indicated by solid lines framing the GUI operational part 142A, whereas the cursor is not overlappingly displayed on the other parts, namely, on the GUI buttons 141 and the GUI operational part 142B, as indicated by dashed lines.

Here, the GUI operational part 142A for the temperature setting is an example of an object on which the setting value of temperature is consecutively replaced and displayed by an input operation. Setting values of the temperature are selection items. For example, in the case of the GUI operational part 142A illustrated in FIG. 3A, the temperature of 21.0° C. is selected. The GUI operational part 142A displays the selection selectable from among multiple temperature setting values ranging from 16.0° C. to 32.0° C. at 0.5° C. intervals.

Also, "the setting value of temperature is consecutively replaced and displayed" means displaying the temperature while replacing the displayed value from 16.0° C. to 32.0° C. at 0.5° C. intervals. Displaying "consecutively" means displaying the setting value at 0.5° C. intervals consecutively, which may be discrete values at 0.5° C. intervals.

Note that the selection items here represent, for example, the setting values of temperature, the selection items may be set for setting values other than the temperature (e.g., the amount of wind of the air-conditioner or the volume of the audio device), and may be non-numerical values. For example, in the case of inputting an address on a navigation system, prefectures names may be displayed consecutively as the selection items.

If a trace operation is performed as an input operation on the touchpad 16A (without a press operation or a long press operation performed), the operational content determiner 111 of the DCU 110 changes the setting value of temperature by one step (0.5° C.) in the operating direction of the trace operation. Alternatively, if a trace operation is performed after a press operation or a long press operation has been performed as an input operation on the touchpad 16A, the operational content determiner 111 consecutively changes the setting value of temperature in the operating direction of the trace operation proportionally to the operational amount.

Here, a flick operation is an operation to move a fingertip by a comparatively short distance along the surface of the touchpad 16A (input operation surface) as if to bounce the fingertip on the surface. A swipe operation is an operation to move a fingertip by a comparatively long distance along the surface of the touchpad 16A as if to sweep the surface by the fingertip.

Also, a press operation is an operation to press the surface of the touchpad 16A by a fingertip in a state of contacting the surface of the touchpad 16A. Since the contacting area increases when the fingertip is further pressed against the surface of the touchpad 16A, the touchpad 16A can detect the press operation. Note that a threshold may be preset in the touchpad 16A to detect a press operation if the contacting area becomes greater than or equal to the threshold.

A long press operation is an operation to hold a fingertip on the touchpad 16A for a predetermined time or longer, to keep a state of contacting the surface. The predetermined period is, for example, 1 second.

More specifically, the operational content determiner 111 determines the operational content as follows. In the case where the setting value of temperature is 21.0° C. as illustrated in FIG. 3A, if a trace operation is performed in an upward direction of the touchpad 16A (toward the front of the vehicle) as an input operation on the touchpad 16A (without a press operation or a long press operation having been performed), the operational content determiner 111 changes the setting value of temperature to 20.5° C. as illustrated in FIG. 3B. Note that if a trace operation is performed in a downward direction of the touchpad 16A (toward the rear of the vehicle), the operational content determiner 111 changes the setting value of temperature to 21.5° C.

Alternatively, if a trace operation is performed in a downward direction of the touchpad 16A (toward the rear of the vehicle) as an input operation on the touchpad 16A after a press operation or a long press operation has been performed as illustrated in FIG. 3C, the operational content determiner 111 consecutively changes the setting value of temperature proportionally to the operational amount of the trace operation. In FIG. 3C, 21.0° C. appears along with 21.5° C. as the next setting value, and 22.0° C. as the one after the next. If the operational amount is greater, the setting values of temperature greater than or equal to 22.5° C. will appear in order. Here, "consecutively changing" means changing the displayed setting values so as to have the following temperature values appear one after another as illustrated in FIG. 3C. Note that the setting values may be discrete values at 0.5° C. intervals.

Note that the mode to consecutively change the setting value of temperature proportionally to the operational amount of a trace operation as illustrated in FIG. 3C may be cancelled by performing a press operation or a long press operation again by a fingertip or a hand contacting the touchpad 16A.

Note that in the mode to consecutively change the setting value of the temperature illustrated in FIG. 3C, the next temperature and the temperature after the next (21.5° C. and 22.0° C. in FIG. 3C) to the currently selected temperature (21.0° C.) may be displayed to be smaller.

Also, in the mode to consecutively change the setting value of the temperature as illustrated in FIG. 3C, the GUI operational parts (141 and 142B) other than the GUI operational part 142A displaying the setting value of temperature may be displayed toned down to be less contrasted (or dark). This is for highlighting the GUI operational part 142A that displays the setting value of temperature.

Figure 4:
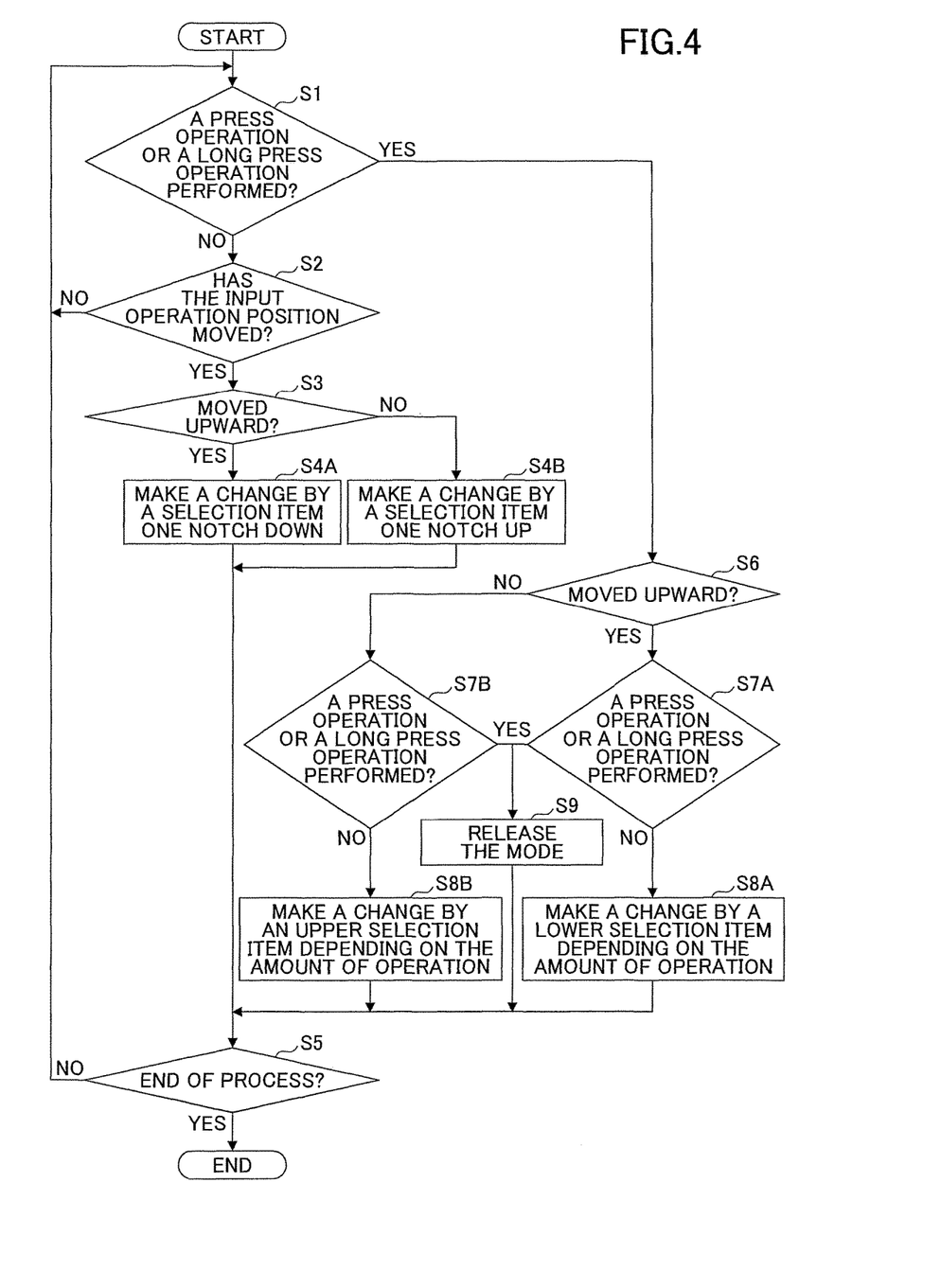
FIG. 4 is a flowchart illustrating a process executed by an operational content determiner 111 of a DCU 110.

FIG. 4 is a flowchart illustrating a process executed by the operational content determiner 111 of the DCU 110.

The DCU 110 starts processing when the ignition switch of the vehicle is turned on (START).

The operational content determiner 111 determines whether a press operation or a long press operation is performed (Step S1).

Next, if having determined that no press operation or long press operation is performed (NO at Step S1), the operational content determiner 111 determines whether the input operation position is moving (Step S2). Note that the coordinates representing the input operation position before starting the movement are held in the memory 113 as coordinates of the starting point to measure the moved amount.

If having determined that the input operation position is moving (YES at Step S2), the operational content determiner 111 determines whether the movement direction is upward (toward the front of the vehicle) (Step S3). The movement direction may be obtained as a movement direction with respect to the input operation position obtained as the starting point at Step S2. Note that if the movement direction moves in an oblique direction with respect to the two axes of the touchpad 16A having a rectangular shape, the determination may be based on the upward component (toward the front of the vehicle) or the downward component (toward the rear of the vehicle) included in the oblique direction.

If having determined that the movement direction is upward (toward the front of the vehicle) (YES at Step S3), the operational content determiner 111 changes the selection item to a selection item one notch down (Step S4A). For example, if the setting value of temperature before the change is 21.0° C. as described above, the setting value of temperature is changed to 20.5° C.

On the other hand, if having determined that the movement direction is downward (toward the rear of the vehicle) (NO at Step S3), the operational content determiner 111 changes the selection item to a selection item one notch up (Step S4A). For example, if the setting value of temperature before the change is 21.0° C. as described above, the setting value of temperature is changed to 21.5° C.

Having completed Step S4A or S4B, the operational content determiner 111 determines whether to terminate the process (Step S5). The process may be terminated, for example, if the ignition switch is turned off.

If having determined not to terminate the process (NO at Step S5), the operational content determiner 111 causes the process to return to Step S1. On the other hand, if having determined to terminate the process (YES at Step S5), the operational content determiner 111 terminates a series of processes (END).

Also, if having determined at Step S1 that a press operation or a long press operation is performed (YES at Step S1), the operational content determiner 111 determines whether the movement direction is upward (toward the front of the vehicle) (Step S6). The movement direction may be obtained as a movement direction of the input operation position with respect to the starting point as in Step S3.

Having determined that the movement direction is upward (toward the front of the vehicle) (YES at Step S6), the operational content determiner 111 determines whether a press operation or a long press operation is performed (Step S7A). This is for determining whether an input operation for canceling the mode to consecutively change the selection item is performed.

If having determined that a press operation or a long press operation is not performed (NO at Step S7A), the operational content determiner 111 changes the selection item to a downward item proportionally to the operational amount (Step S8A). For example, if the setting value of temperature before the change is 21.0° C. as described above, the operational content determiner 111 displays consecutive setting values greater than or equal to 21.5° C. at 0.5° C. intervals proportionally to the operational amount, and changes the setting value to a value that corresponds to the operational amount when the input operation was completed. At this time, as illustrated in FIG. 3C, 21.0° C. is displayed along with 21.5° C. as the next setting value, and 22.0° C. as the one after the next; if the operational amount increases, setting values of the temperature greater than or equal to 22.5° C. are displayed on the display panel 15 one after another. Such a process is displayed on the display panel 15, based on a command issued by the operational content determiner 111.

On the other hand, if having determined that the movement direction is downward (toward the rear of the vehicle) (NO at Step S6), the operational content determiner 111 determines whether a press operation or a long press operation is performed (Step S7B). This is for determining whether an input operation for canceling the mode to consecutively change the selection item is performed as in Step S7A.

If having determined that a press operation or a long press operation is not performed (NO at Step S7B), the operational content determiner 111 changes the selection item to an upward item proportionally to the operational amount (Step S8B). For example, if the setting value of temperature before the change is 21.0° C. as described above, the operational content determiner 111 displays consecutive setting values less than or equal to 20.5° C. in the downward direction one after another.

After having completed processing Step S8A or S8B, the operational content determiner 111 advances the process to Step S5.

If having determined at Step S7A or S7B that a press operation or a long press operation is performed (YES at S7A or S7B), the operational content determiner 111 cancels the mode to consecutively change the selection item (Step S9).

Note that if having determined at Step S2 that the input operation position is not moving (NO at Step S2), the operational content determiner 111 causes the process to return to Step S1.

As described above, if a trace operation is performed in an upward (toward the front of the vehicle) direction or a lower (toward the rear of the vehicle) direction of the touchpad 16A as an input operation on the touchpad 16A (without a press operation or a long press operation having been performed), the input device for the vehicle 100 changes a selection item such as the setting value of temperature just by one notch.

Alternatively, if a trace operation is performed in an upward (toward the front of the vehicle) direction or a lower (toward the rear of the vehicle) direction of the touchpad 16A as an input operation on the touchpad 16A after a press operation or a long press operation has been performed, the input device for the vehicle 100 consecutively changes a selection item such as the setting value of temperature proportionally to the operational amount of the trace operation.

Therefore, when performing an input operation on the touchpad 16A, it is possible to selectively use an operation to change the selection item by one notch, or an operation to consecutively change the selection, to change an operation item.

Thus, it is possible to provide an input device for a vehicle 100 and a method of controlling the input device for the vehicle that enable the user to easily operate an object whose selection items are replaced and displayed consecutively.

Also, if a trace operation is performed in an upward (toward the front of the vehicle) direction or a lower (toward the rear of the vehicle) direction of the touchpad 16A after a press operation or a long press operation has been performed as an input operation on the touchpad 16A, and then, a press operation or a long press operation is performed again, the input device for the vehicle 100 can cancel the mode to consecutively change the selection item.

Therefore, it is possible to cancel the mode to consecutively change the selection item easily and securely, and thereby, it is possible to provide an input device for a vehicle 100 and a method of controlling the input device for the vehicle that enable the user to easily operate an object whose selection items are replaced and displayed consecutively.

Note that in the above, the embodiment has been described in which the mode to consecutively change the selection item is cancelled when a press operation or a long press operation is performed again. However, among components of the operational amount of an input operation, if a component in a direction perpendicular to the direction in which selection items are replaced becomes greater than or equal to a predetermined threshold, the mode to consecutively change the selection item proportionally to the operational amount in the operating direction of the trace operation, may be changed. Such a determination may be performed at Step S7A and S7B.

Also, although a form has been described in which the display panel 15 and the touchpad 16A are placed at separate locations, the display panel 15 and the touchpad 16A may be superimposed. For example, the touchpad 16A may be superimposed on the display surface side of the display panel 15.

As above, an input device for a vehicle and a method of controlling the input device for the vehicle have been described according to exemplary embodiments of the present invention. Note that the present invention is not limited to the embodiments specifically disclosed as above, but various modifications and changes can be made without deviating from the subject matters described in the claims.

The invention claimed is:

1. An input device for a vehicle, comprising:
a position detector placed in an interior of the vehicle, and configured to have an input operation surface on which a user performs an input operation, to detect a position at which the input operation is performed on the input operation surface;
a display unit placed in the interior of the vehicle, and configured to display a plurality of objects;
an electronic control unit (ECU) for controlling an image to be displayed on the display unit, the electronic control unit including an operational content determiner and a display controller, the electronic control unit further including a computer having memory, a processor for executing programs stored in the memory, an input/output interface, a communication interface, a transceiver, and an internal bus, the electronic control unit configured to:
based on a moved amount of the position of the input operation, to calculate a correspondence position corresponding to the position of the input operation in the display unit detected by the position detector, and to determine whether a content of the input operation corresponds to a predetermined operational content with the operational content determiner; and
display the object depending on a determination result of the operational content determiner, and to overlappingly display a selection image to select one of the objects located at the correspondence position, with the one of the objects with the display controller,
wherein in a case where the selection image is overlappingly displayed with an object among the objects whose selection items are consecutively replaced and displayed by the input operation, (i) in response to the position of the input operation being moved along a predetermined direction, without a press operation or a long press operation having been performed as the input operation, the operational content determiner changes the selection item by a predetermined count irrespective of the moved amount of the position of the input operation along the predetermined direction, to cause the display controller to display the selection item, or (ii) in response to the position of the input operation being moved along the predetermined direction after a press operation or a long press operation has been performed as the input operation, the operational content determiner consecutively changes the selection item proportionally to the moved amount of the position of the input operation along the predetermined direction, to cause the display controller to display the selection item,
wherein in a case where a component of the operational amount of the input operation in a direction perpendicular to a direction in which the selection item is to be changed becomes greater than or equal to a predetermined threshold, the ECU cancels a mode to consecutively change the selection item depending on the movement direction of the position of the input operation with the operational content determiner.

2. The input device for the vehicle as claimed in claim 1, wherein in a case where a press operation or a long press operation is performed again after the press operation or the long press operation has been performed, the ECU cancels a mode to consecutively change the selection item proportionally to the operational amount in the movement direction of the position of the input operation with the operational content determiner.

3. The input device for the vehicle as claimed in claim 2, wherein the selection image is a cursor representing selection of one of the objects.

4. The input device for the vehicle as claimed in claim 1, wherein the selection image is a cursor representing selection of one of the objects.

5. The input device for the vehicle as claimed in claim 1, wherein the selection image is a cursor representing selection of one of the objects.

6. A method of controlling an input device for a vehicle, wherein the input device for the vehicle includes
a position detector placed in an interior of the vehicle, and configured to have an input operation surface on which a user performs an input operation, to detect a position at which the input operation is performed on the input operation surface;
a display unit placed in the interior of the vehicle, and configured to display a plurality of objects;
an electronic control unit (ECU) for controlling an image to be displayed on the display unit, the electronic control unit including an operational content determiner and a display controller, the electronic control unit further including a computer having memory, a processor for executing programs stored in the memory, an input/output interface, a communication interface, a transceiver, and an internal bus, the electronic control unit configured to:

based on a moved amount of the position of the input operation, to calculate a correspondence position corresponding to the position of the input operation in the display unit detected by the position detector, and to determine whether a content of the input operation corresponds to a predetermined operational content with the operational content determiner; and display the object depending on a determination result of the operational content determiner, and to overlappingly display a selection image to select one of the objects located at the correspondence position, with the one of the objects with the display controller, the method comprising:

in a case where the selection image is overlappingly displayed with an object among the objects whose selection items are consecutively replaced and displayed by the input operation, (i) in response to the position of the input operation being moved along a predetermined direction, without a press operation or a long press operation having been performed as the input operation, changing the selection item by a predetermined count irrespective of the moved amount of the position of the input operation along the predetermined direction, to cause the display controller to display the selection item, or (ii) in response to the position of the input operation being moved along the predetermined direction after a press operation or a long press operation has been performed as the input operation, consecutively changing the selection item proportionally to the moved amount of the position of the input operation along the predetermined direction, to cause the display controller to display the selection item, wherein in a case where a component of the operational amount of the input operation in a direction perpendicular to a direction in which the selection item is to be changed becomes greater than or equal to a predetermined threshold, the ECU cancels a mode to consecutively change the selection item depending on the movement direction of the position of the input operation with the operational content determiner.

* * * * *